US010650837B2

(12) United States Patent
Sørensen et al.

(10) Patent No.: US 10,650,837 B2
(45) Date of Patent: May 12, 2020

(54) EARLY TRANSMISSION IN PACKETIZED SPEECH

(71) Applicant: Microsoft Technology Licensing, LLC, Redmond, WA (US)

(72) Inventors: Karsten Vandborg Sørensen, Stockholm (SE); Sriram Srinivasan, Sammamish, WA (US); Koen Bernard Vos, Singapore (SG)

(73) Assignee: Microsoft Technology Licensing, LLC, Redmond, WA (US)

( * ) Notice: Subject to any disclaimer, the term of this patent is extended or adjusted under 35 U.S.C. 154(b) by 164 days.

(21) Appl. No.: 15/689,248

(22) Filed: Aug. 29, 2017

(65) Prior Publication Data

US 2019/0066709 A1    Feb. 28, 2019

(51) Int. Cl.
| | | |
|---|---|---|
| *G10L 19/125* | (2013.01) | |
| *G10L 25/90* | (2013.01) | |
| *G10L 19/22* | (2013.01) | |
| *H04L 29/06* | (2006.01) | |
| *G10L 19/16* | (2013.01) | |
| G10L 19/005 | (2013.01) | |
| G10L 19/097 | (2013.01) | |
| H04J 3/06 | (2006.01) | |

(52) U.S. Cl.
CPC .......... *G10L 19/125* (2013.01); *G10L 19/167* (2013.01); *G10L 19/22* (2013.01); *G10L 25/90* (2013.01); *H04L 65/1083* (2013.01); *H04L 65/607* (2013.01); *H04L 65/608* (2013.01); *H04L 65/80* (2013.01); *G10L 19/005* (2013.01); *G10L 19/097* (2013.01); *H04J 3/0632* (2013.01)

(58) Field of Classification Search
CPC ..... G10L 19/125; G10L 19/167; G10L 25/90; G10L 19/22; G10L 19/097; G10L 19/005; H04L 65/80; H04L 65/608; H04L 65/607; H04L 65/1083; H04J 3/0632
USPC ........................................................ 704/215
See application file for complete search history.

(56) References Cited

U.S. PATENT DOCUMENTS

| | | | |
|---|---|---|---|
| 8,433,563 | B2 | 4/2013 | Vos et al. |
| 9,070,364 | B2 | 6/2015 | Oh et al. |
| 9,082,416 | B2 | 7/2015 | Krishnan et al. |
| 9,336,790 | B2 | 5/2016 | Gao |
| 9,564,143 | B2 | 2/2017 | Tsutsumi et al. |

(Continued)

OTHER PUBLICATIONS

"International Search Report and Written Opinion Issued in PCT Application No. PCT/US2018/036169", dated Aug. 10, 2018, 12 Pages.

(Continued)

*Primary Examiner* — Bharatkumar S Shah
(74) *Attorney, Agent, or Firm* — NovoTechIP International PLLC (57) ABSTRACT

Network communication speech handling systems are provided herein. In one example, a method of processing audio signals by a network communications handling node is provided. The method includes processing an audio signal to determine a pitch cycle property associated with the audio signal, determining transfer times for encoded segments of the audio signal based at least in part on the pitch cycle property, and transferring packets comprising one or more encoded segments for delivery to a target node in accordance with the transfer time.

18 Claims, 4 Drawing Sheets

(56) References Cited

U.S. PATENT DOCUMENTS

2002/0145999 A1    10/2002  Dzik
2006/0062215 A1    3/2006  Lam
2015/0051905 A1*  2/2015  Gao ...................... G10L 19/125
                                                          704/207
2015/0262588 A1*  9/2015  Tsutsumi ............. G10L 19/005
                                                          704/207

OTHER PUBLICATIONS

Valin, et al., "Definition of the Opus Audio Codec", In Proceedings of Network Working Group, Feb. 15, 2011, pp. 1-185.

\* cited by examiner

EARLY TRANSMISSION IN PACKETIZED SPEECH

BACKGROUND

Network voice and video communication systems and applications, such as Voice over Internet Protocol (VoIP) systems, Skype®, or Skype® for Business systems, have become popular platforms for not only providing voice calls between users, but also for video calls, live meeting hosting, interactive white boarding, and other point-to-point or multi-user network-based communications. These network telephony systems typically rely upon packet communications and packet routing, such as the Internet, instead of traditional circuit-switched communications, such as the Public Switched Telephone Network (PSTN) or circuit-switched cellular networks.

In many examples, communication links can be established among one or more endpoints, such as user devices, to provide voice and video calls or interactive conferencing within specialized software applications on computers, laptops, tablet devices, smartphones, gaming systems, and the like. As these network telephony systems have grown in popularity, associated traffic volumes have increased and efficient use of network resources that carry this traffic has been difficult to achieve. Among these difficulties is efficient encoding and decoding of speech content for transfer among endpoints, as well as reducing lag or latency in speech exchanged among endpoints due to network delays and encoding/decoding delays. Although various high-compression audio and video encoding/decoding algorithms (codecs) have been developed over the years, these codecs can still produce undesirable voice or speech lag among endpoints.

OVERVIEW

Network communication speech handling systems are provided herein. In one example, a method of processing audio signals by a network communications handling node is provided. The method includes processing an audio signal to determine a pitch cycle property associated with the audio signal, determining transfer times for encoded segments of the audio signal based at least in part on the pitch cycle property, and transferring packets comprising one or more encoded segments for delivery to a target node in accordance with the transfer time.

This Overview is provided to introduce a selection of concepts in a simplified form that are further described below in the Detailed Description. It may be understood that this Overview is not intended to identify key features or essential features of the claimed subject matter, nor is it intended to be used to limit the scope of the claimed subject matter.

BRIEF DESCRIPTION OF THE DRAWINGS

Many aspects of the disclosure can be better understood with reference to the following drawings. While several implementations are described in connection with these drawings, the disclosure is not limited to the implementations disclosed herein. On the contrary, the intent is to cover all alternatives, modifications, and equivalents.

DETAILED DESCRIPTION

Network communication systems and applications, such as Voice over Internet Protocol (VoIP) systems, Skype® systems, Skype® for Business systems, Microsoft Lync® systems, and online group conferencing, can provide voice calls, video calls, live information sharing, and other interactive network-based communications. Communications of these network telephony and conferencing systems can be routed over one or more packet networks, such as the Internet, to connect any number of endpoints. More than one distinct network can route communications of individual voice calls or communication sessions, such as when one endpoint is associated with different networks than other endpoints. Network control elements can communicatively couple these different networks and can establish communication links for routing of network telephony traffic between the networks.

In many examples, communication links can be established among one or more endpoints, such as user devices, to provide voice or video calls via interactive conferencing within specialized software applications. Although interactive sessions or live communication sessions are often employed, recorded sessions or speech can also be employed to replay archived content. To transfer content that includes speech, audio, or video content over the communication links and associated packet network elements, various codecs have been developed to encode and decode the content. The examples herein discuss enhanced techniques to handle at least speech or audio-based media content, although similar techniques can be applied to other content, such as mixed content or video content. Also, although speech or audio signals are discussed in the Figures herein, it should be understood that this speech or audio can accompany other media content, such as video, slides, animations, or other content.

The enhanced techniques discussed herein advantageously provide for technical effects of increased efficiency in transfer of speech and other packetized content over networked systems. Specifically, early transmission of packetized speech can be performed using various enhanced techniques discussed herein to analyze speech for periodic/repeating patterns and cycles in pitch or energy of speech signals. Technical effects further include less lag or latency in audio transmissions, as well as more efficient encoding and decoding of speech signals in codecs that employ speech lag processing. Although the enhanced techniques may require additional computational resources than systems that do not employ them, the reduction in algorithmic lag can be advantageous to warrant the additional resources.

Figure 1:
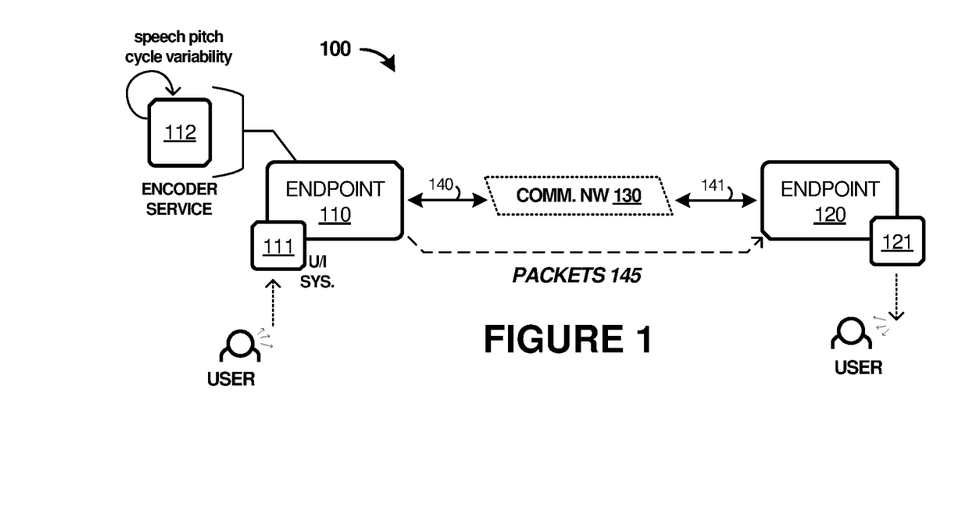
FIG. 1 is a system diagram of a network communication environment in an implementation.

To provide enhanced operation of network content transfer among endpoints, various example implementations are provided below. In a first implementation, FIG. 1 is presented. FIG. 1 is a system diagram of network communication environment 100. Environment 100 includes user endpoint devices 110 and 120 which communicate over communication network 130. Endpoint devices 110 and 120 can include user interface systems 111 and 121, respectively. Endpoint devices 110 and 120 can also include further elements detailed for endpoint device 110, such as early transmission encoder 112, among other elements discussed below.

In operation, endpoint devices 110 and 120 can engage in communication sessions, such as calls, conferences, messaging, and the like. For example, endpoint device 110 can establish a communication session over link 140 with any other endpoint device, including more than one endpoint device. Endpoint identifiers are associated with the various endpoints that communicate over the network telephony platform. These endpoint identifiers can include node identifiers (IDs), network addresses, aliases, or telephone numbers, among other identifiers. For example, endpoint device 110 might have a telephone number or user ID associated therewith, and other users or endpoints can use this information to initiate communication sessions with endpoint device 110. Other endpoints can each have associated endpoint identifiers. In FIG. 1, a communication session is established between endpoint 110 and endpoint 120. Communication links 140-141 as well as communication network 130 are employed to establish the communication session among endpoints.

During these communication sessions, endpoints can continually capture and encode user audio for delivery to one or more other endpoints. These endpoints might employ various codecs to encode audio and subsequently deliver the encoded audio over a packet communication link. To capture, encode, and deliver a continuous audio stream, such as live audio, a conference call, or other endpoint audio, periodic processes are typically employed. These periodic processes enable portions of captured audio to be streamed to endpoints using discrete packets. However, endpoints might capture audio into a digital format using a first periodic rate, while transferring encoded audio in packets at a second periodic rate. Differences between these two periodic rates as well as properties of the audio itself can lead to inefficiencies and delays in transferring audio among endpoints. These inefficiencies and delays can lead to audio lag, latency, and other audio quality problems.

Figure 2:
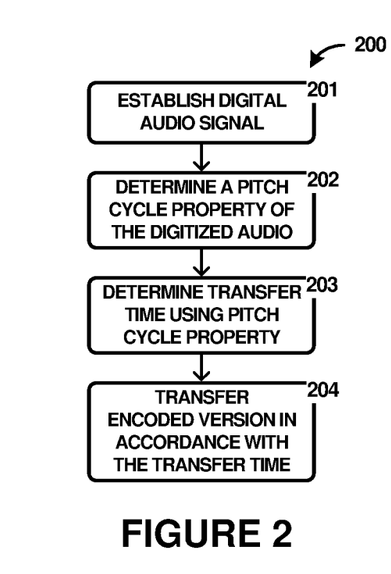
FIG. 2 illustrates a method of operating a network communication endpoint in an implementation.

To describe enhanced operations within environment 100, FIG. 2 is presented. FIG. 2 is a flow diagram illustrating example operation of the elements of FIG. 1. The discussion below focuses on the encoding and transmission of speech signals by endpoint 110 and encoder service 112. It should be understood that various analog-to-digital (A/D) conversion, digital-to-analog (D/A) conversion, encoding and decoding, and other processes are applied at each endpoint, and communications can occur in a bi-directional or multi-user manner.

In FIG. 2, endpoint 110 establishes (201) digital audio signals based on captured audio at endpoint 110. For example, a user might be engaging in a communication session with another endpoint, and audio or speech originated by the user can be captured by a microphone or other transducer at endpoint 110. A/D circuitry in endpoint 110 converts the captured audio into a digital format, and delivers this audio to encoder service 112 for encoding and ultimate transfer to one or more endpoints.

Encoder service 112 processes (202) these digital audio signals to determine pitch cycle properties associated with the underlying audio or speech. The human voice can be comprised of various vocal frequencies due to oscillation of vocal chords, throat resonances, and other speech properties. Among these frequencies are pitch cycles or pitch periods that correspond to periodic bursts of energy in the speech signals. Although non-speech audio signals can include periodic pitch cycles, these pitch cycles are typically found in human speech, and thus the examples herein focus on speech and human vocalizations. Typically, these pitch frequencies range from about 55 Hertz (Hz) to about 400 Hz. Pitch periods or cycles associated with these frequencies include ranges from about 18 milliseconds (ms) to about 2.5 ms, which correspond to the inverse of the pitch frequencies.

Pitch synchronous encoding has been developed which consider the pitch frequencies or pitch periods/cycles when processing digital audio into encoded versions. By considering the pitch properties, more efficient encoding can be employed for speech-related audio. However, while periodic cycles for digital signal delivery and packet transfer can be fixed according to a predetermined rate, clock rate, or delay interval, the periodic cycles associated with human speech can vary over time. This variation can lead to inefficiencies and lags in transferring audio that has been processed using pitch synchronous encoding.

Thus, encoder service 112 advantageously determines (203) transfer times for encoded segments of the audio signal based at least in part on the pitch cycle properties. Encoder service 112 then can periodical transfer (204) packets 145 comprising one or more encoded segments for delivery to a target node in accordance with the transfer time. The transfer times can include transferring encoded audio out-of-sequence with respect to a predetermined packet transfer rate to reduce algorithmic lag and increase performance of endpoints that receive the encoded audio. When non-speech audio is captured, a variable transfer time might not be employed, since periodic speech cycles might not be found for the incoming audio. However, the techniques herein can be applied to any audio or other content that includes a variable periodic property that is utilized in encoding processes.

Referring back to the elements of FIG. 1, endpoint devices 110 and 120 each can comprise network transceiver circuitry, wireless transceiver circuitry, analog-to-digital conversion circuitry, digital-to-analog conversion circuitry, processing circuitry, encoders, decoders, speech processors, codec processors, signal processors, and user interface elements. The transceiver circuitry typically includes amplifiers, filters, modulators, and signal processing circuitry. Endpoint devices 110 and 120 can also each include user interface systems, network interface card equipment, memory devices, non-transitory computer-readable storage mediums, software, processing circuitry, or some other communication components. Endpoint devices 110 and 120 can each be a computing device, tablet computer, smartphone, computer, wireless communication device, subscriber equipment, customer equipment, access terminal, telephone, mobile wireless telephone, personal digital assistant (PDA), app, network telephony application, video conferencing device, video conferencing application, e-book, mobile Internet appliance, wireless network interface card, media player, game console, or some other communication apparatus, including combinations thereof.

Each endpoint 110 and 120 also includes user interface systems 111 and 121, respectively. Users can provide speech or other audio to the associated user interface system, such as via microphones or other transducers. User can receive audio, video, or other media content from portions of the user interface system, such as speakers, graphical user interface elements, touchscreens, displays, or other elements. User interface systems 111 and 121 can further include analog-to-digital conversion and digital-to-analog conversion circuitry and associated control software.

Communication network 130 comprises one or more packet switched networks. These packet-switched networks can include wired, optical, or wireless portions, and route traffic over associated links. Various other networks and communication systems can also be employed to carry traffic associated with speech packets 145 and other signals. Moreover, communication network 130 can include any number of routers, switches, bridges, servers, monitoring services, flow control mechanisms, and the like.

Communication links 140-141 each use metal, glass, optical, air, space, or some other material as the transport media. Communication links 140-141 each can use various communication protocols, such as Internet Protocol (IP), Ethernet, WiFi, Bluetooth, synchronous optical networking (SONET), asynchronous transfer mode (ATM), Time Division Multiplex (TDM), hybrid fiber-coax (HFC), circuit-switched, communication signaling, wireless communications, or some other communication format, including combinations, improvements, or variations thereof. Communication links 140-141 each can be a direct link or may include intermediate networks, systems, or devices, and can include a logical network link transported over multiple physical links. In some examples, link 140-141 each comprises wireless links that use the air or space as the transport media.

Figure 3:
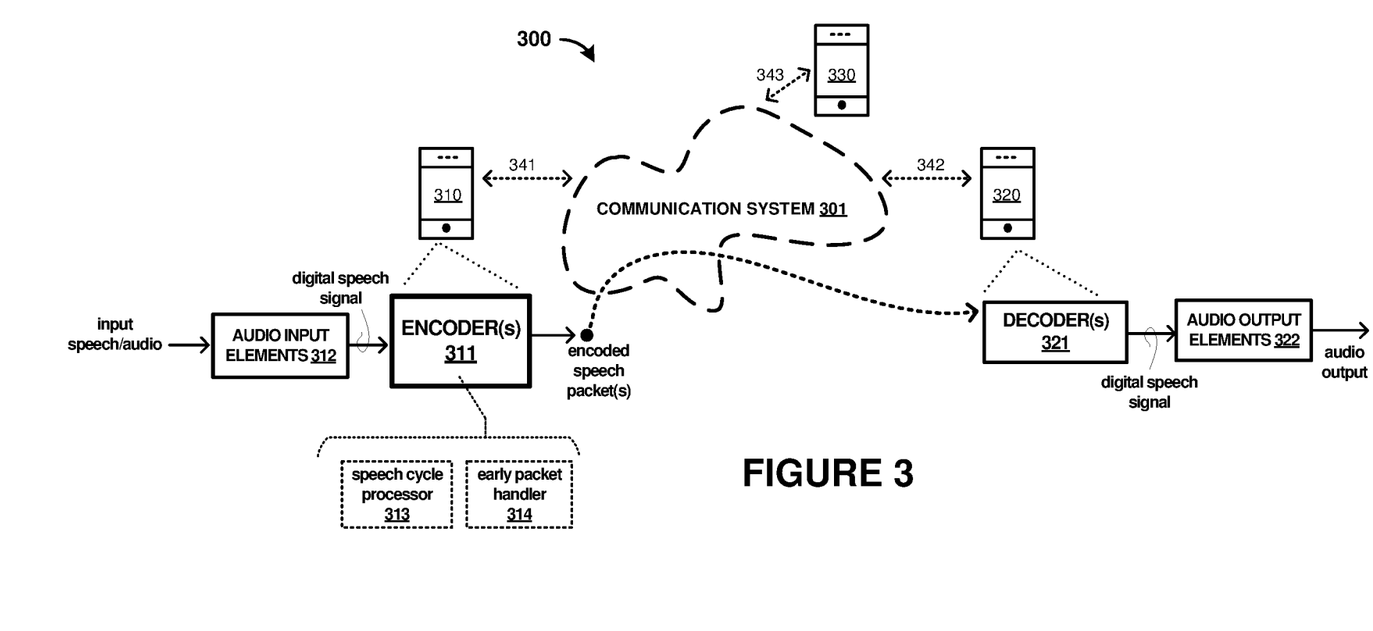
FIG. 3 is a system diagram of a network communication environment in an implementation.

Turning now to another example implementation of early transmission speech services, FIG. 3 is provided. FIG. 3 illustrates a further example of a communication environment in an implementation. Specifically, FIG. 3 illustrates network telephony environment 300. Environment 300 includes communication system 301, and user devices 310, 320, and 330. User devices 310, 320, and 330 comprise user endpoint devices in this example, and each communicates over an associated communication link that carries media legs for communication sessions. User devices 310, 320, and 330 can communicate over system 301 using associated links 341, 342, and 343.

Further details of user devices 310, 320, and 330 are illustrated in FIG. 3 for exemplary user devices 310 and 320. It should be understood that any of user devices 310, 320, and 330 can include similar elements, and any of user devices 310, 320, and 330 can be configured to receive and transmit audio or other media content. In FIG. 3, user device 310 includes encoder(s) 311 and audio input elements 312, while user device 320 includes decoder(s) 321 and audio output elements 322. Encoder 311 further includes speech lag processor 313 and early packet handler 314. The internal elements of user devices 310, 320, and 330 can be provided by hardware processing elements, hardware conversion and handling circuitry, or by software elements, including combinations thereof.

In FIG. 3, encoder 311 is shown as having several internal elements, namely speech cycle processor 313 and early packet handler 314. Further elements can be included, and one or more elements can be combined into common elements. Furthermore, each of the elements 313-134 can be implemented using discrete circuity, specialized or general-purpose processors, software or firmware elements, or combinations thereof.

The elements of FIG. 3, specifically speech lag processor 313 and early packet handler 314 of encoder 311, provide for enhanced early speech packet transmission in network telephony communications. Input audio is provided to audio input elements 312, such as via a microphone or audio transducer. Audio input elements 312 can include A/D conversion processes or circuitry which converts analog audio into digital audio. This digital audio, namely the digital speech signal in FIG. 3, can then be provided to encoder 311 for processing and delivery to other endpoints or user devices. In some examples, the input audio is received from another source, over a network link, RF link, Bluetooth link, or other links, and provided to encoder 311 in a digital format. Encoder 311 might be included in user device 310 as pictured in FIG. 3, or might instead comprise a service or process that is external to user device 310.

Encoder 311 processes the digital audio into one or more encoded segments which are transferred as packets over link 341 and communication system 301 for delivery to other user devices or endpoints, such as user devices 320 and 330, among others. Once received, this encoded and packetized audio can be decoded by the receiving device or endpoint, such as shown for endpoint 320. Decoders 321 associated with user device 320 can transform the encoded audio into a decoded digital format, which can then be transformed by audio output elements 322 into analog output audio for presentation to a user of user device 320. As with encoder 311, decoder 321 can be internal to a user device or comprise an external service or process that is called by user device 320. Moreover, the decoded digital audio might not be presented to a user, and instead recorded or otherwise stored for later use.

Encoder 311 includes enhanced processing of the digital audio to reduce algorithmic lag in delivering encoded audio to other devices or endpoints. This leads to less latency in delivery of packets that carry the encoded audio, as well as better user experiences for presenting audio on the output devices. To enable this enhanced processing, speech cycle processor 313 and early packet handler 314 are employed. Operations related to this enhanced processing are discussed below with regard to FIG. 4.

Figure 4:
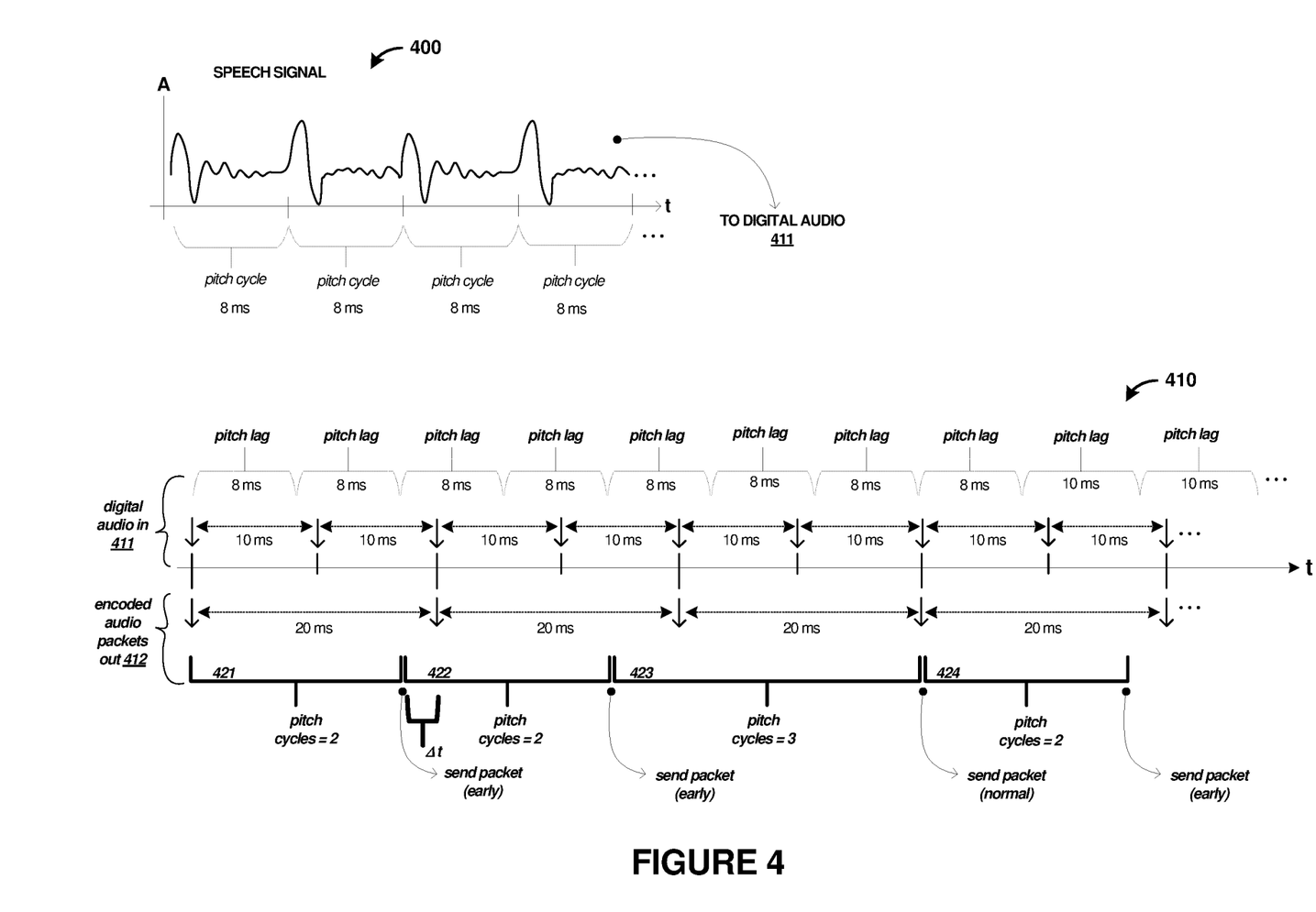
FIG. 4 illustrates example speech signal processing in an implementation.

FIG. 4 is provided to provide a more graphical view of the process described above in FIG. 3, and can relate to operations of elements shown in FIG. 1 or FIG. 3. In FIG. 4, a speech signal is shown in graph 400 as comprising various waveforms that represent user speech captured by a user device. Although an analog representation of the speech signal is shown in graph 400, it should be understood that the encoders discussed herein typically employ digital versions of these analog signals. Encoder 311 processes the speech signal to determine pitch cycle properties associated with the underlying audio or speech, such as pitch cycles.

In graph 400, various speech pitch cycles are shown, and these can be determined based on frequency content of the speech signal or by other signal processing techniques. A pitch cycle or period comprises a recurring or periodic pattern in a speech signal due to characteristics of the human voice. This recurring or periodic pattern can vary from human to human, and time to time for the same speaker. The human voice can be comprised of various vocal frequencies due to oscillation of vocal chords, throat resonances, and other speech properties. Among the frequencies are these pitch cycles or pitch periods that correspond to periodic bursts of energy in the speech signals. Although non-speech audio signals can include periodic pitch cycles, these pitch cycles are typically found in human speech, and thus the examples herein focus on speech and human vocalizations. Typically, these pitch frequencies range from about 55 Hertz (Hz) to about 400 Hz. Pitch periods or cycles associated with these frequencies include ranges from about 18 milliseconds (ms) to about 2.5 ms, which correspond to the inverse of the pitch frequencies. In some examples, the pitch cycle or period is related to a fundamental frequency of a speech signal, such as found using time-domain correlation techniques, frequency component analysis, Fourier transforms, fast Fourier transforms (FFT), or other signal processing techniques.

Pitch synchronous encoding techniques have been developed which consider these pitch frequencies or pitch periods/cycles when processing digital audio into encoded versions. By considering the pitch properties, more efficient encoding can be employed for speech-related audio. With pitch synchronous coding, the start and end times of a signal window being described in each packet do not typically increment in constant amounts, unlike the rest of the voice processing in both sender and receiver user devices. As a result, pitch synchronous coding techniques can have an algorithmic delay (i.e. the total processing delay from encoding and decoding) that varies per packet. In certain cases, choices can be made to minimize the worst case algorithmic delay. The examples found herein include enhanced techniques to minimize this delay.

In FIG. 3, encoder 311 sends an integer number of pitch cycles per packet and receives input digital audio in shorter chunks than the average packet interval. To provide enhanced operations, encoder 311 can selectively reduce delay by sending certain packets early using early packet handler 314. This operation can be seen in operational example 410 in FIG. 4.

In operational example 410, encoder 311 receives digital audio 411 representing the speech signal at a first periodic rate, such as 10 ms in FIG. 4. This periodic rate can correspond to an interval at which software processes associated with encoder 311 read digital audio 411 from an associated buffer after an A/D conversion process occurs, among other considerations.

Packets 412 are scheduled to be sent out at a periodic interval of 20 ms from user device 310, and this periodic rate is different than that of the input rate of digital audio 411. If encoder 311 gets 10 ms of audio at a time and the average packet interval is 20 ms, then encoder 311 can advantageously reduce latency without sending more packets. Normally, encoder 311 sends a packet for every second 10 ms input frame. However, if after the first 10 ms frame encoder 311 predicts that a next subframe will be too long to finish before the end of the second 10 ms frame, encoder 311 can selectively send the packet 10 ms early. If encoder 311 were to wait another 10 ms, different packet payload/content would not necessarily result, but more delay or lag would be added.

To provide this early transmission of packets, encoder 311 employs a predictive process related to pitch lag or the pitch cycles described above. In graph 400, an exemplary speech signal can have a pitch cycle of 8 ms. This pitch cycle can vary from time to time due to speech patterns, speech content, as well as among speech originators (e.g. among humans). However, since pitch synchronous encoding is employed by encoder 311, only an integer number of pitch cycles are included in each packet transmission interval. Thus, a mismatch can occur among the pitch cycles and the various periodic processes employed in intake of digital audio and subsequent encoding/packet transmission.

The predictive processes for subsequent subframes of audio can determine a predicted pitch 'lag' until a pitch cycle associated with the subsequent subframe will complete. In a perfect prediction process, worst case latency would never exceed 10 ms in this example. In practice, the prediction process can have inaccuracies and variances that might limit the reduction in lag. However, even imperfect prediction can lead to a significant reduction in lag involved in transferring encoded audio to endpoints. Moreover, variations in pitch lag due to changes in the pitch cycles can be compensated for using a continual or periodic determination of the current pitch cycle associated with a speech cycle.

Turning now to the process shown in operational example 410, digital audio 411 is received into encoder 311 according to a first periodic rate, namely 10 ms. However, the pitch cycle is presently determined as 8 ms by speech cycle processor 313, increasing to 10 ms later in the example. Moreover, a predetermined packet transfer rate of 20 ms is employed, thus a mismatch between the periodic rates of the incoming audio, the pitch cycles, and the packet transmission interval is found. Encoder 311 can vary the integer number of pitch cycles included in each packet transmission according to the pitch lag predicted for the incoming audio.

In first packet interval 421, two pitch cycles are encountered, and part of a third pitch cycle is encountered. However, encoder 311 predicts that the third pitch cycle will have a pitch lag that exceeds a cutoff time for the packet interval. Instead of waiting for the predetermined packet interval to occur, namely the next 20 ms period, encoder 311 can perform an 'early' encode and transfer of the subframes or portions of digital audio that have already been received. This produces one or more segments of encoded audio that are packetized and transferred earlier for delivery over network link 341, reducing lag by at least Δt. The intervening portion of audio corresponding to the next pitch cycle can then be included in an encoded audio segment and transferred during the next packet interval.

Packet interval 422 also includes two pitch cycles as with packet interval 421, due to the prediction that the pitch lag would carry over a further audio portion into another packet interval. Since the pitch synchronous encoding is employed, only integer numbers of pitch cycle durations of audio are included in each packet transmission, and thus wasted lag can be reduced by early transmission of packets once encoder 311 determines that pitch lag associated with a further portion of audio will not be completely received in time to be included in a current packet interval. In some cases, a different number of pitch cycle durations of audio can be included, such as in packet interval 423 which includes 'old' audio of a pitch cycle that was not included in a previous packet interval due to the corresponding pitch lag. A final example packet interval is shown for packet interval 424 which includes two pitch cycle durations of encoded audio. As the pitch cycle changes over time, encoder 311 can compensate by continually comparing the currently predicted pitch lag with the packet interval to selectively encode and transfer audio early or to wait until the normally scheduled packet interval.

Figure 5:
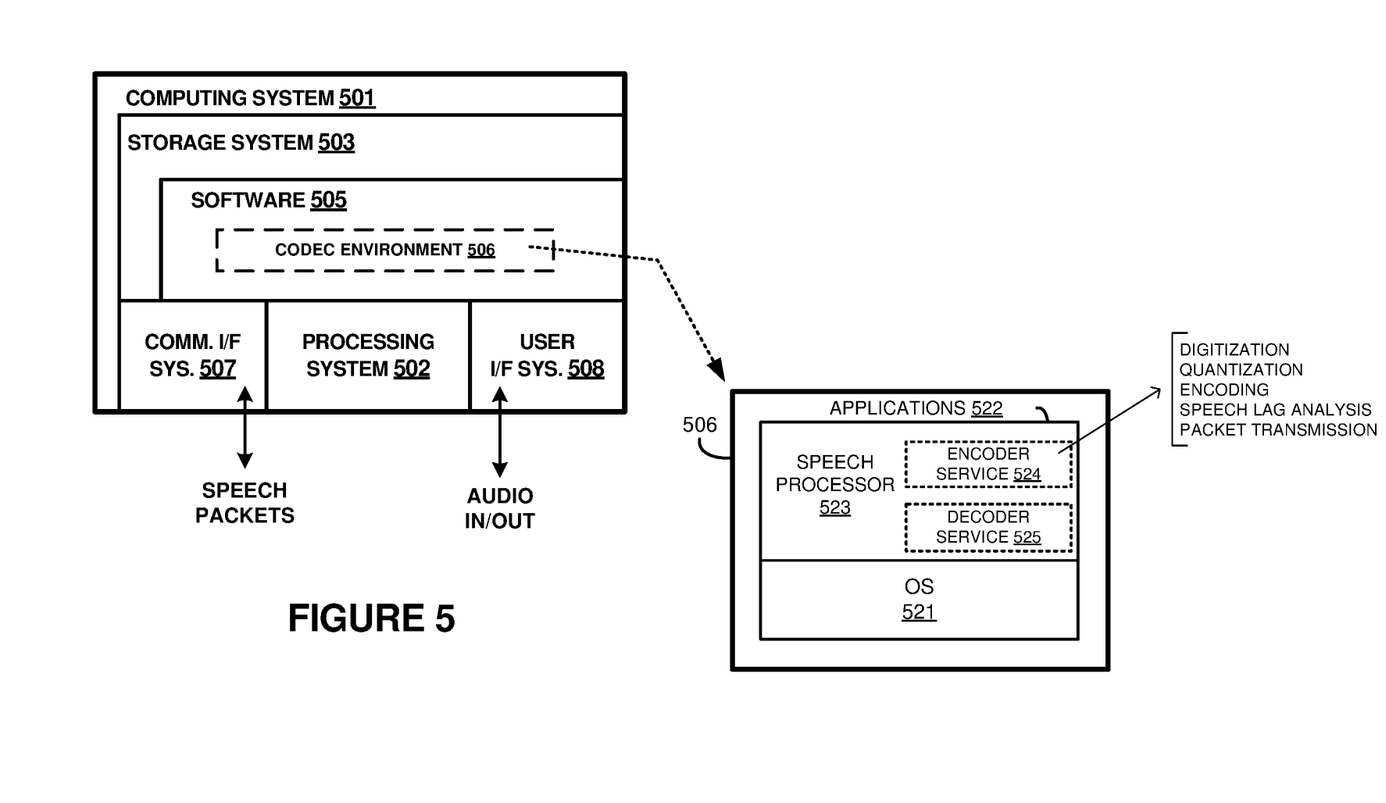
FIG. 5 illustrates an example computing platform for implementing any of the architectures, processes, methods, and operational scenarios disclosed herein.

FIG. 5 illustrates computing system 501 that is representative of any system or collection of systems in which the various operational architectures, scenarios, and processes disclosed herein may be implemented. For example, computing system 501 can be used to implement any of endpoint of FIG. 1 or user device of FIG. 3. Examples of computing system 501 include, but are not limited to, computers, smartphones, tablet computing devices, laptops, desktop computers, hybrid computers, rack servers, web servers, cloud computing platforms, cloud computing systems, distributed computing systems, software-defined networking systems, and data center equipment, as well as any other type of physical or virtual machine, and other computing systems and devices, as well as any variation or combination thereof.

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 508. Processing system 502 is operatively coupled with storage system 503, communication interface system 507, and user interface system 508.

Processing system 502 loads and executes software 505 from storage system 503. Software 505 includes monitoring environment 506, which is representative of the processes discussed with respect to the preceding Figures. When executed by processing system 502 to enhance communication sessions and audio media transfer for user devices and associated communication systems, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may comprise a micro-processor and processing circuitry that retrieves and executes software 505 from storage system 503. Processing system 502 may be implemented within a single processing device, but may also be distributed across multiple processing devices, sub-systems, or specialized circuitry, that cooperate in executing program instructions and in performing the operations discussed herein. Examples of processing system 502 include general purpose central processing units, application specific processors, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 503 may also include computer readable communication media over which at least some of software 505 may be communicated internally or externally. Storage system 503 may be implemented as a single storage device, but may also be implemented across multiple storage devices or sub-systems co-located or distributed relative to each other. Storage system 503 may comprise additional elements, such as a controller, capable of communicating with processing system 502 or possibly other systems.

Software 505 may be implemented in program instructions and among other functions may, when executed by processing system 502, direct processing system 502 to operate as described with respect to the various operational scenarios, sequences, and processes illustrated herein. For example, software 505 may include program instructions for enhanced voice/speech codecs and early transmission and receipt of packetized speech, among other operations.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 505 may include additional processes, programs, or components, such as operating system software or other application software, in addition to or that include monitoring environment 506. Software 505 may also comprise firmware or some other form of machine-readable processing instructions executable by processing system 502.

In general, software 505 may, when loaded into processing system 502 and executed, transform a suitable apparatus, system, or device (of which computing system 501 is representative) overall from a general-purpose computing system into a special-purpose computing system customized to facilitate enhanced voice/speech codecs and early transmission and receipt of packetized speech. Indeed, encoding software 505 on storage system 503 may transform the physical structure of storage system 503. The specific transformation of the physical structure may depend on various factors in different implementations of this description. Examples of such factors may include, but are not limited to, the technology used to implement the storage media of storage system 503 and whether the computer-storage media are characterized as primary or secondary storage, as well as other factors.

For example, if the computer readable storage media are implemented as semiconductor-based memory, software 505 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Codec environment 506 includes one or more software elements, such as OS 521 and applications 522. These elements can describe various portions of computing system 501 with which user endpoints, user systems, or control nodes, interact. For example, OS 521 can provide a software platform on which application 522 is executed and allows for enhanced encoding, decoding, and transmission of speech, audio, or other media.

In one example, encoder service 524 encodes speech, audio, or other media as described herein. Encoder service 524 can digitize analog audio to reach a predetermined quantization level, and perform various codec processing to encode the audio or speech for transfer over a communication network coupled to communication interface system 507. Encoder service 524 can convert analog audio into a digital format, and encode audio in the digital format into an encoded version for transfer in packets to a recipient system. Encoder service 524 performs speech cycle analysis to determine a pitch lag associated with underlying speech signals to predictively transfer packets containing encoded audio earlier than normal packet intervals in certain cases.

In another example, decoder service 525 receives speech, audio, or other media as described herein in an encoded format included in one or more packets. Decoder service 525 can process the encoded audio to decode the audio using various codecs and techniques discussed herein. In some examples, encoder service 524 and decoder service 525 employ pitch synchronous speech codecs.

Communication interface system 507 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange packetized communications with other computing systems or networks of systems, such as metal, glass, air, or any other suitable communication media.

User interface system 508 is optional and may include a keyboard, a mouse, a voice input device, a touch input device for receiving input from a user. Output devices such as a display, speakers, web interfaces, terminal interfaces, and other types of output devices may also be included in user interface system 508. User interface system 508 can provide output and receive input over a network interface, such as communication interface system 507. In network examples, user interface system 508 might packetize audio, display, or graphics data for remote output by a display system or computing system coupled over one or more network interfaces. Physical or logical elements of user interface system 508 can provide alerts or anomaly informational outputs to users or other operators. User interface system 508 may also include associated user interface software executable by processing system 502 in support of the various user input and output devices discussed above. Separately or in conjunction with each other and other hardware and software elements, the user interface software and user interface devices may support a graphical user interface, a natural user interface, or any other type of user interface.

Communication between computing system 501 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transmission control protocol (TCP), and the user datagram protocol (UDP), as well as any other suitable communication protocol, variation, or combination thereof.

Certain inventive aspects may be appreciated from the foregoing disclosure, of which the following are various examples.

Example 1

A method of processing audio signals by a network communications handling node, the method comprising processing an audio signal to determine a pitch cycle property associated with the audio signal, determining transfer times for encoded segments of the audio signal based at least in part on the pitch cycle property, and transferring packets comprising one or more encoded segments for delivery to a target node in accordance with the transfer time.

Example 2

The method of Example 1, further comprising establishing a packet interval for periodically transferring the packets with associated encoded segments, and determining the transfer times to initiate transfer of one or more of the packets earlier than a next associated packet interval based at least on the pitch cycle property indicating a delay to include a further encoded segment would last beyond the next associated packet interval.

Example 3

The method of Examples 1-2, further comprising including the further encoded segment for transfer in further packets after the next associated packet interval.

Example 4

The method of Examples 1-3, further comprising determining early transfer times for the one or more encoded segments based at least in part on the pitch cycle property indicating an integer number of pitch cycles can be transferred within a packet interval associated with the packets.

Example 5

The method of Examples 1-4, further comprising initiating transfer of the packets comprising the one or more encoded segments responsive to the one or more encoded segments reaching the integer number of pitch cycles, where the early transfer time is prior to a transfer time associated with the packet interval.

Example 6

The method of Examples 1-5, where each of the encoded segments comprises a portion of the audio signal corresponding to one pitch cycle.

Example 7

The method of Examples 1-6, where the pitch cycle property corresponds to a fundamental frequency of a speech signal represented by the audio signal.

Example 8

The method of Examples 1-7, where the target node receives the packets comprising the one or more encoded segments and subsequently decodes the one or more encoded segments based at least in part on each of the one or more encoded segments comprising a portion of the audio signal corresponding to one pitch cycle.

Example 9

A computing apparatus comprising one or more computer readable storage media, a processing system operatively coupled with the one or more computer readable storage media, and program instructions stored on the one or more computer readable storage media. When executed by the processing system, the program instructions direct the processing system to at least process an audio signal to determine a pitch cycle property associated with the audio signal, determine transfer times for encoded segments of the audio signal based at least in part on the pitch cycle property, and transfer packets comprising one or more encoded segments for delivery to a target node in accordance with the transfer time.

Example 10

The computing apparatus of Example 9, comprising further program instructions, that when executed by the processing system, direct the processing system to at least establish a packet interval for periodically transferring the packets with associated encoded segments, and determine the transfer times to initiate transfer of one or more of the packets earlier than a next associated packet interval based at least on the pitch cycle property indicating a delay to include a further encoded segment would last beyond the next associated packet interval.

Example 11

The computing apparatus of Examples 9-10, comprising further program instructions, that when executed by the processing system, direct the processing system to at least include the further encoded segment for transfer in further packets after the next associated packet interval.

Example 12

The computing apparatus of Examples 9-11, comprising further program instructions, that when executed by the processing system, direct the processing system to at least determine early transfer times for the one or more encoded segments based at least in part on the pitch cycle property indicating an integer number of pitch cycles can be transferred within a packet interval associated with the packets.

Example 13

The computing apparatus of Examples 9-12, comprising further program instructions, when executed by the processing system, direct the processing system to at least initiate transfer of the packets comprising the one or more encoded segments responsive to the one or more encoded segments reaching the integer number of pitch cycles, where the early transfer time is prior to a transfer time associated with the packet interval.

Example 14

The computing apparatus of Examples 9-13, where each of the encoded segments comprises a portion of the audio signal corresponding to one pitch cycle.

Example 15

The computing apparatus of Examples 9-14, where the pitch cycle property corresponds to a fundamental frequency of a speech signal represented by the audio signal.

Example 16

The computing apparatus of Examples 9-15, where the target node receives the packets comprising the one or more encoded segments and subsequently decodes the one or more encoded segments based at least in part on each of the one or more encoded segments comprising a portion of the audio signal corresponding to one pitch cycle.

Example 17

A network telephony node, comprising an audio input element configured to convert input audio into digital audio and deliver to an encoder service at a periodic rate, and a speech cycle processor configured to process the digital audio to determine pitch cycle durations associated with the input audio. The encoder service is configured to encode portions of the digital audio into encoded segments for periodic packet delivery of integer groupings of the encoded segments over a packet network link. The encoder service is configured to determine when a portion of the digital audio is predicted to span into a subsequent packet delivery period based in part on a current pitch cycle duration, and trigger early delivery of associated encoded segments without waiting for the portion of the digital audio to be encoded. The network telephony node also includes a network interface configured to transfer the encoded segments over the packet network link.

Example 18

The network telephony node of Example 17, comprising the encoder service configured to include one or more further encoded segments related to the portion of the digital audio for transfer during the subsequent packet delivery period.

Example 19

The network telephony node of Examples 17-18, where each of the encoded segments comprises a portion of the input audio corresponding to one pitch cycle duration, and where the pitch cycle durations correspond to fundamental frequencies of vocalizations represented in the input audio.

Example 20

The network telephony node of Examples 17-19, where the periodic rate the digital audio is delivered to the encoder service is faster than a rate of the periodic packet delivery, and where the pitch cycle durations can vary with respect to the periodic rate of the digital audio is delivered to the encoder service and the rate of the periodic packet delivery.

The functional block diagrams, operational scenarios and sequences, and flow diagrams provided in the Figures are representative of exemplary systems, environments, and methodologies for performing novel aspects of the disclosure. While, for purposes of simplicity of explanation, methods included herein may be in the form of a functional diagram, operational scenario or sequence, or flow diagram, and may be described as a series of acts, it is to be understood and appreciated that the methods are not limited by the order of acts, as some acts may, in accordance therewith, occur in a different order and/or concurrently with other acts from that shown and described herein. For example, those skilled in the art will understand and appreciate that a method could alternatively be represented as a series of interrelated states or events, such as in a state diagram. Moreover, not all acts illustrated in a methodology may be required for a novel implementation.

The descriptions and figures included herein depict specific implementations to teach those skilled in the art how to make and use the best option. For the purpose of teaching inventive principles, some conventional aspects have been simplified or omitted. Those skilled in the art will appreciate variations from these implementations that fall within the scope of the present disclosure. Those skilled in the art will also appreciate that the features described above can be combined in various ways to form multiple implementations. As a result, the invention is not limited to the specific implementations described above, but only by the claims and their equivalents.

What is claimed is:

1. A method of processing audio signals by a network communications handling node, the method comprising:
processing an audio signal to determine a pitch cycle property associated with the audio signal;
determining transfer times for encoded segments of the audio signal based at least in part on the pitch cycle property by
establishing a packet interval for periodically transferring packets associated with encoded segments, wherein a packet may include one or more encoded segments; and
determining a transfer time for a respective packet that is earlier than a packet interval associated with the respective packet based on the pitch cycle property predicting that a delay to include a further encoded segment would exceed the packet interval associated with the respective packet; and
periodically transferring packets comprising one or more encoded segments for delivery to a target node in accordance with the transfer time.

2. The method of claim 1, further comprising:
including the further encoded segment for transfer in further packets after the next associated packet interval.

3. The method of claim 1, further comprising:
determining early transfer times for the one or more encoded segments based at least in part on the pitch cycle property indicating an integer number of pitch cycles can be transferred within a packet interval associated with the packets.

4. The method of claim 3, further comprising:
initiating transfer of the packets comprising the one or more encoded segments responsive to the one or more encoded segments reaching the integer number of pitch cycles, wherein the early transfer time is prior to a transfer time associated with the packet interval.

5. The method of claim 1, wherein each of the encoded segments comprises a portion of the audio signal corresponding to one pitch cycle.

6. The method of claim 1, wherein the pitch cycle property corresponds to a fundamental frequency of a speech signal represented by the audio signal.

7. The method of claim 1, wherein the target node receives the packets comprising the one or more encoded segments and subsequently decodes the one or more encoded segments based at least in part on each of the one or more encoded segments comprising a portion of the audio signal corresponding to one pitch cycle.

8. A computing apparatus comprising:
one or more computer readable storage media;
a processing system operatively coupled with the one or more computer readable storage media; and
program instructions stored on the one or more computer readable storage media, that when executed by the processing system, direct the processing system to at least:
process an audio signal to determine a pitch cycle property associated with the audio signal;
determine transfer times for encoded segments of the audio signal based at least in part on the pitch cycle property, the instructions to determine the transfer times include instructions to direct the processing system to:
establish a packet interval for periodically transferring packets associated with encoded segments, wherein a packet may include one or more encoded segments; and
determine a transfer time for a respective packet that is earlier than a packet interval associated with the respective packet based on the pitch cycle property predicting that a delay to include a further encoded segment would exceed the packet interval associated with the respective packet; and
periodically transfer packets comprising one or more encoded segments for delivery to a target node in accordance with the transfer time.

9. The computing apparatus of claim 8, comprising further program instructions, that when executed by the processing system, direct the processing system to at least:
include the further encoded segment for transfer in further packets after the next associated packet interval.

10. The computing apparatus of claim 8, comprising further program instructions, that when executed by the processing system, direct the processing system to at least:
determine early transfer times for the one or more encoded segments based at least in part on the pitch cycle property indicating an integer number of pitch cycles can be transferred within a packet interval associated with the packets.

11. The computing apparatus of claim 10, comprising further program instructions, that when executed by the processing system, direct the processing system to at least:
initiate transfer of the packets comprising the one or more encoded segments responsive to the one or more encoded segments reaching the integer number of pitch cycles, wherein the early transfer time is prior to a transfer time associated with the packet interval.

12. The computing apparatus of claim 8, wherein each of the encoded segments comprises a portion of the audio signal corresponding to one pitch cycle.

13. The computing apparatus of claim 8, wherein the pitch cycle property corresponds to a fundamental frequency of a speech signal represented by the audio signal.

14. The computing apparatus of claim 8, wherein the target node receives the packets comprising the one or more encoded segments and subsequently decodes the one or more encoded segments based at least in part on each of the one or more encoded segments comprising a portion of the audio signal corresponding to one pitch cycle.

15. A network telephony node, comprising:
an audio input element configured to convert input audio into digital audio and deliver to an encoder service at a periodic rate;
a speech cycle processor configured to process the digital audio to determine pitch cycle durations associated with the input audio;
the encoder service configured to encode portions of the digital audio into encoded segments for periodic packet delivery of integer groupings of the encoded segments in packets over a packet network link;
the encoder service configured to establish a packet interval for periodically transferring the packets;
the encoder service configured to determine when encoding a current portion of the digital audio is predicted to span into a subsequent packet interval based in part on a current pitch cycle duration predicting that encoding and adding the encoded segment into a current packet will span into the subsequent packet interval, and trigger early delivery of the current packet without waiting for the current portion of the digital audio to be encoded; and a network interface configured to transfer the encoded segments over the packet network link.

16. The network telephony node of claim 15, comprising:

the encoder service configured to include one or more further encoded segments related to the portion of the digital audio for transfer during the subsequent packet delivery period.

17. The network telephony node of claim 15, wherein each of the encoded segments comprises a portion of the input audio corresponding to one pitch cycle duration, and wherein the pitch cycle durations correspond to fundamental frequencies of vocalizations represented in the input audio.

18. The network telephony node of claim 15, wherein the periodic rate the digital audio is delivered to the encoder service is faster than a rate of the packet interval, and wherein the pitch cycle durations can vary with respect to the periodic rate of the digital audio is delivered to the encoder service and the rate of the packet interval.

\* \* \* \* \*